(12) United States Patent
Arima (10) Patent No.: US 9,766,750 B2
(45) Date of Patent: Sep. 19, 2017

(54) INFORMATION PROCESSING APPARATUS AND DISPLAY CONTROL METHOD

(71) Applicant: FUJITSU LIMITED, Kawasaki-shi, Kanagawa (JP)

(72) Inventor: Hisao Arima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/578,635

(22) Filed: Dec. 22, 2014

(65) Prior Publication Data

US 2015/0199068 A1 Jul. 16, 2015

(30) Foreign Application Priority Data

Jan. 10, 2014 (JP) .................. 2014-003166

(51) Int. Cl.
*G06F 3/041* (2006.01)
(52) U.S. Cl.
CPC .......... *G06F 3/0418* (2013.01); *G06F 3/0412* (2013.01)
(58) Field of Classification Search
CPC ..... G06F 3/0412; G06F 3/0416; G06F 3/0418
USPC ........................................................ 345/173
See application file for complete search history.

(56) References Cited

U.S. PATENT DOCUMENTS

| | | | | |
|---|---|---|---|---|
| 8,487,896 | B1 * | 7/2013 | Brown ................... | G06F 3/0416 345/173 |
| 9,229,567 | B2 * | 1/2016 | Parekh ................... | G06F 3/0416 |
| 9,298,307 | B2 * | 3/2016 | Chen ...................... | G06F 3/0416 |
| 9,430,067 | B2 * | 8/2016 | Tokutake ................ | G06F 3/041 |
| 2010/0321307 | A1 * | 12/2010 | Hirokawa .............. | G06F 3/0418 345/173 |
| 2012/0242589 | A1 * | 9/2012 | Schmidt ................ | G06F 3/0488 345/173 |
| 2013/0278515 | A1 | 10/2013 | Kikuchi | |
| 2014/0062918 | A1 * | 3/2014 | Chen ..................... | G06F 3/0416 345/173 |

FOREIGN PATENT DOCUMENTS

| | | |
|---|---|---|
| JP | 2002-041242 | 2/2002 |
| JP | 2011013996 A * | 1/2011 |
| JP | 2013-225178 A | 10/2013 |

OTHER PUBLICATIONS

Machine Translation of JP-2011-013996.*
Japanese Office Action dated May 9, 2017 for corresponding Japanese Patent Application No. 2014-003166, with Partial English Translation, 4 pages.

* cited by examiner

*Primary Examiner* — Jason Mandeville
(74) *Attorney, Agent, or Firm* — Fujitsu Patent Center (57) ABSTRACT

An information processing apparatus including a coordinate calculation unit configured to calculate a coordinate of a touch position detected by a touch input unit for inputting information of a position on a display, a counter configured to count a counter value when the touch position is detected, the counter value being acquired from the coordinate calculation unit, a synchronization unit configured to synchronize the counter with a timer before the coordinate calculation unit calculates the coordinate, a coordinate correction unit configured to acquire time information from the timer and correct the calculated coordinate using the time information and the counter value of the counter synchronized with the timer, and a drawing unit configured to perform a drawing process of the display using the corrected coordinate.

3 Claims, 8 Drawing Sheets

INFORMATION PROCESSING APPARATUS AND DISPLAY CONTROL METHOD

CROSS-REFERENCE TO RELATED APPLICATION

This application is based upon and claims the benefit of priority of the prior Japanese Patent Application No. 2014-003166, filed on Jan. 10, 2014, the entire contents of which are incorporated herein by reference.

FIELD

The embodiments described herein are related to an information processing apparatus including a touch input unit and a display control method in the information processing apparatus.

BACKGROUND

Information processing apparatuses such as popular mobile phone terminals include smartphones and tablets with capacitance touch panels for users to perform various operations with fingers.

It is desirable for the information processing apparatuses to improve the detection accuracy of touch positions in order to improve the user operability.

For example, in the patent document 1 below, the host of the information processing apparatus uses the touch positions of the user operations on the touch panel and the time information obtained a timer of the information processing apparatus to correct the drawing positions at display timings.

The following patent document describes conventional techniques related to the techniques described herein.

Patent Document

[Patent document 1] Japanese Laid-Open Patent Publication No. 2002-41242

SUMMARY

According to one embodiment, it is provided an information processing apparatus including a coordinate calculation unit configured to calculate a coordinate of a touch position detected by a touch input unit for inputting information of a position on a display, a counter configured to count a counter value when the touch position is detected, the counter value being acquired from the coordinate calculation unit, a synchronization unit configured to synchronize the counter with a timer before the coordinate calculation unit calculates the coordinate, a coordinate correction unit configured to acquire time information from the timer and correct the calculated coordinate using the time information and the counter value of the counter synchronized with the timer, and a drawing unit configured to perform a drawing process of the display using the corrected coordinate.

It is to be understood that both the foregoing general description and the following detailed description are exemplary and explanatory and are not restrictive of the invention, as claimed.

DESCRIPTION OF EMBODIMENTS

The delay between when the touch panel detects the physical contact by the finger etc. of the user and when the host receives information used for the correction of drawing positions and the like varies in time. Therefore, the larger the variation of the delay becomes, the larger the gap between the temporal variation of the corrected coordinates and the temporal alteration of the coordinates of the positions of the user operations becomes. Namely, the information processing apparatus as described above may not be able to correct the drawing positions by reflecting user's operations appropriately. It is an aspect according to the embodiments disclosed herein to provide an information processing apparatus for performing correction of touch positions by advantageously reflecting user's operations of a touch input unit in order to provide smooth operability. First, an information processing apparatus according to a comparative example is described below with reference to the drawings.

Comparative Example

Figure 1:
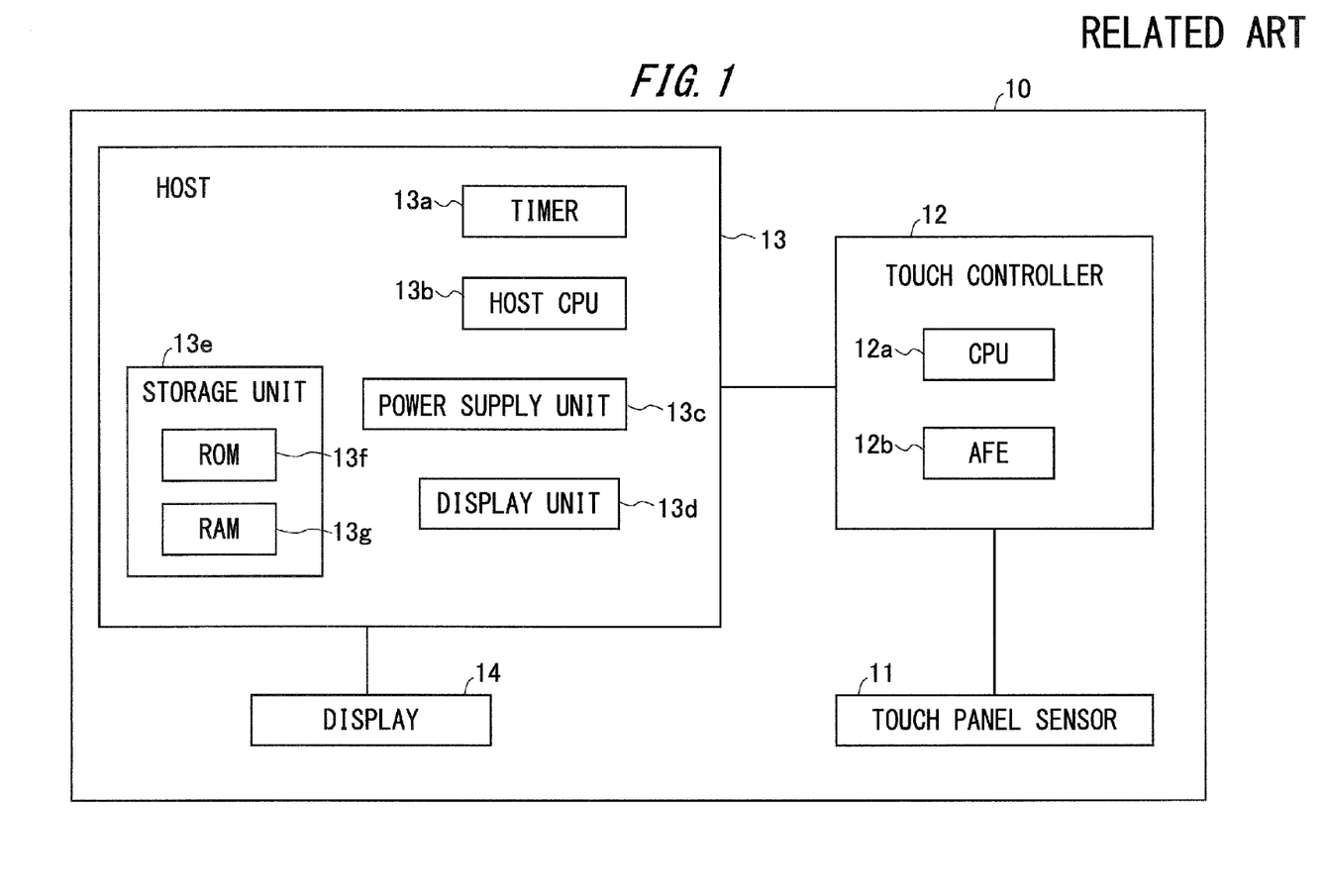
FIG. 1 is a diagram schematically illustrating a hardware configuration of an information processing apparatus according to a comparative example.

As illustrated in FIG. 1, the information processing apparatus 10 includes a touch panel sensor 11, a touch controller 12, a host 13 and a display 14. The touch panel sensor 11 detects touches by a user's finger etc. The touch controller 12 performs coordinate calculation processes based on touch positions detected by the touch panel sensor 11. The host 13 corrects drawing positions on the display 14 based on the calculation results of the coordinate calculations performed by the touch controller 12. The display 14 performs drawing processes under the control of the host 13.

The touch panel sensor 11 is a so-called capacitance touch panel. And the touch panel sensor 11 includes a plurality of transparent electrodes so that a position at which the capacitance between a user's finger etc. and the electrode varies is detected as a touch position. The touch panel sensor 11 is an example of a touch input unit. It is noted that although a capacitance touch panel is used as an example of the touch panel sensor 11 in the present embodiment, the touch panel sensor 11 is not limited to this type of touch panel. The detection results of touch positions detected by the touch panel sensor 11 are subject to signal conversion performed by the AFE (Analog Front End) 12b of the touch controller 12. The AFE 12b performs to the detection results of the touch panel sensor 11 processes including signal amplifications, signal conversions of current signals into voltage signals and signal denoising. The results of the conversion processes performed by the AFE 12b are sent to the CPU 12a.

The CPU 12a performs coordinate transformations of the touch positions detected by the touch panel sensor 11 by using the results of the processes performed by the AFE 12b. The coordinate data of the touch positions calculated by the CPU 12a is sent to the host CPU 13b. When the host CPU 13b acquires coordinate data from the CPU 12a of the touch controller 12, the host CPU 13b acquires time data of the current time from the timer 13a. And the CPU 12a performs correction processes of the coordinate data in accordance with the timings of displaying of the display 14 performed by the display unit 13.

Figure 2:
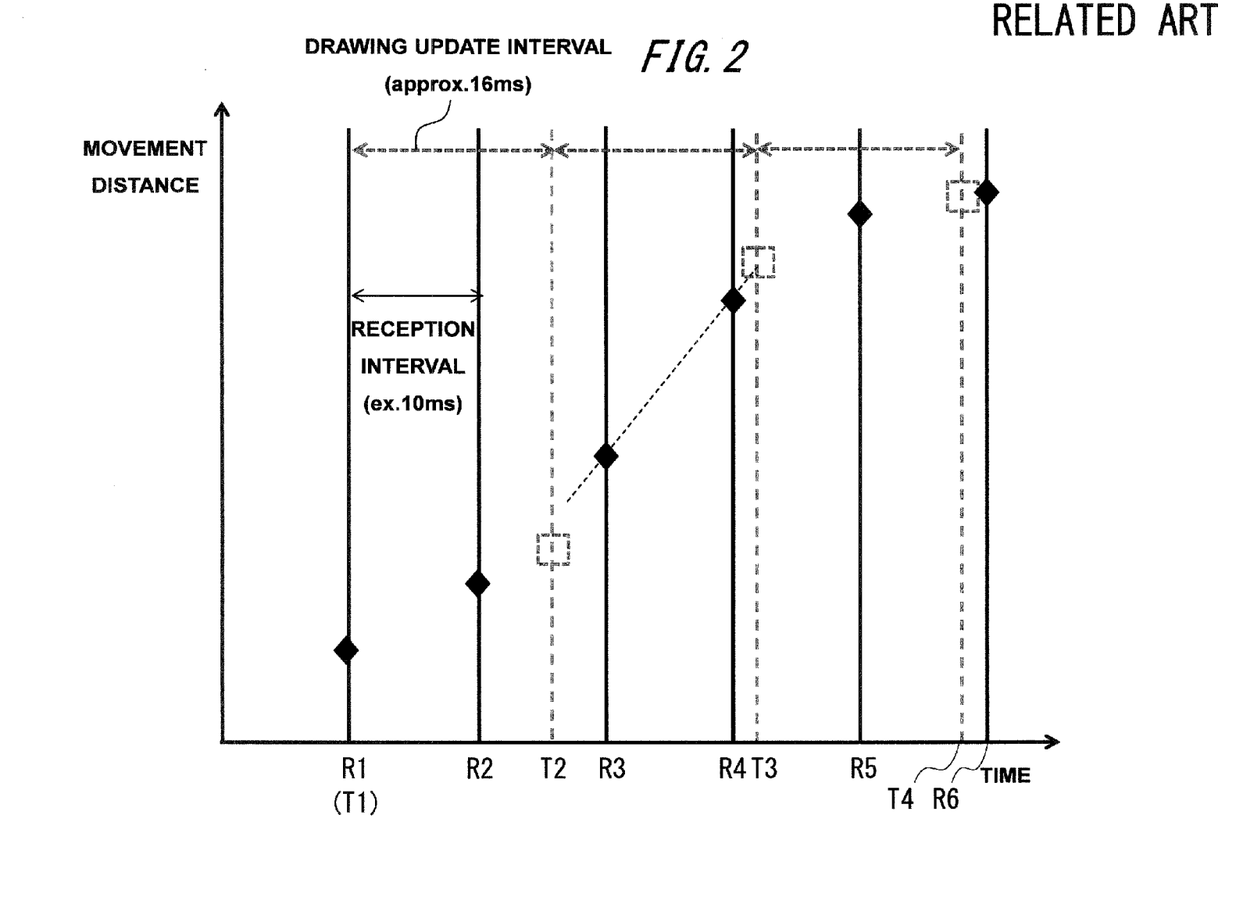
FIG. 2 is a graph illustrating an example of coordinate correction processes of touch positions on a touch panel of the information processing apparatus.

FIG. 2 schematically illustrates a graph of an example of the principle of the correction processes of the coordinate data. In the graph as illustrated in FIG. 2, the variations of the touch positions and the drawing positions are illustrated by the movement distance of the touch positions. It is noted that the horizontal axis represents time and the vertical axis represents movement distance in the graph. In the case of the example as illustrated in FIG. 2, the host CPU 13b of the host 13 receives coordinate data from the CPU 12a of the touch controller 12 at predetermined reception intervals such as 10 ms, namely, at the timings of R1 to R6 in the graph. And the host CPU 13b corrects the coordinates based on the received coordinate data at predetermined display timings of the display 14 such as 16 ms, namely, at the timings of T1 to T4. For example, when the host CPU 13b corrects the coordinates in accordance with the display timing T3, the host CPU 13b estimates the coordinate at the display timing T3 by using the coordinate data received at the reception timings of R3 and R4 between the previous display timing T2 and the current display timing T3. And then, the host CPU 13b provides the estimated coordinate as the corrected coordinate. In the present embodiment, the coordinates at the display timings are corrected by a linear function obtained by coordinates indicated by the received coordinate data. In addition, various conventional techniques for coordinate correction can be employed for correcting the coordinates. For example, the coordinates can be corrected by using linear interpolation. Further, the accelerations of the movements of the touch positions can be taken into consideration for correcting the coordinates.

Figure 3:
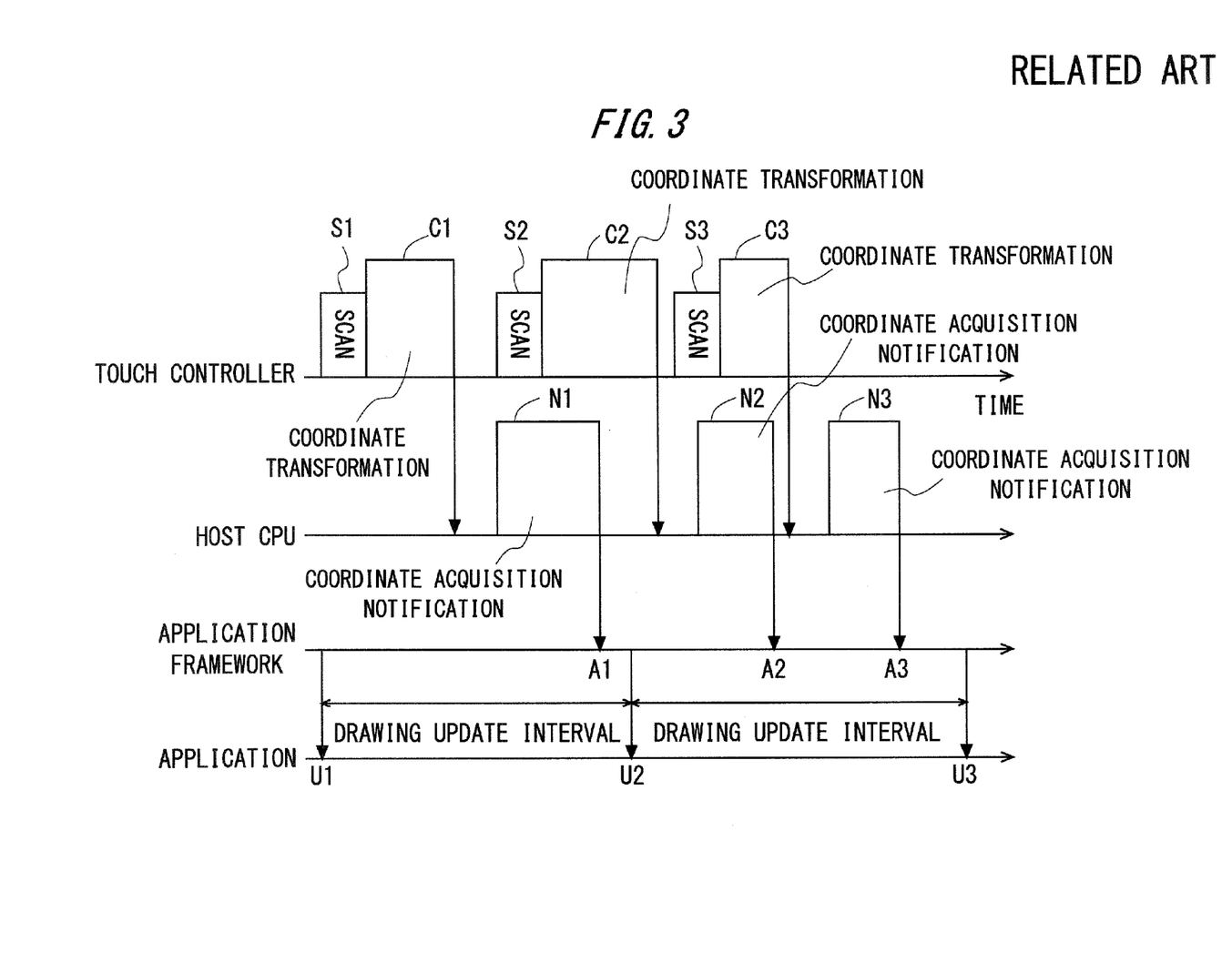
FIG. 3 is a graph illustrating display processes related to coordinates of touch positions in the information processing apparatus according to the comparative example.

FIG. 3 is a diagram schematically illustrating coordinate calculation processes performed by the information processing apparatus 10 in the comparative example. As illustrated in FIG. 3, the touch controller 12 controls the touch panel sensor 11 to perform scanning at predetermined timings to detect a touch occurred by a user's finger etc. (S1, S2, S3). When the scanning is completed, the touch controller 12 performs a coordinate transformation of the detected touch position (C1, C2, C3). It is noted that FIG. 3 illustrates a case in which a touch is detected in each scanning S1, S2 and S3. When a touch is not detected in a scanning, the touch controller 12 does not perform the coordinate transformation and waits for the next scanning.

When the coordinate transformation processes are completed, the touch controller 12 notifies the host CPU 13b that the touch detection occurs. When the host CPU 13b receives the notification of the touch detection, the host CPU 13b requests the touch controller 12 to transmit the transformed coordinate data to the host CPU 13b. It is noted that the host CPU 13b executes the request for the coordinate data as an interrupt processing. And then the touch controller 12 transmits the transformed coordinate data to the host CPU 13b in response to the request from the host CPU 13b.

As illustrated in FIG. 3, the processing time for the coordinate transformation performed by the touch controller 12 differs from process to process. The reasons of the differences lie for example in the facts that the larger the contact area of the user's finger etc. on the touch panel sensor 11 becomes the more the amount of operations increases, and that the amount of operations increases as the number of fingers detected by the touch panel sensor 11 increases as in the case of so-called multi-touch. In addition, one of the reasons is the fact that the amount of correction processes etc. performed according to the size of the influences which come from the change of the usage environment of the information processing apparatus 10. The change of the usage environment includes the increase and decrease of noise from a battery charger (not illustrated) of the information processing apparatus 10 and the increase and decrease in the environmental temperature. In FIG. 3, the processing time of the coordinate transformation process C2 is longer than the processing time of the coordinate transformation processes C1 and C3.

Further, as illustrated in FIG. 3, the processing time for coordinate correction performed by the host CPU 13b also differs from process to process. The reasons of the differences lie for example in the fact that the delay occurred when the host CPU 13b performs interrupt processing for requesting the touch controller 12 to transmit coordinate data to the host CPU 13b depends on the operating conditions of the operation clock of the CPU and on the file access conditions of the CPU. Moreover, the difference of the processing time also occurs when the host CPU 13b performs data exchange with the touch controller 12 via a data bus such as I2C/SPI. For example, when a conflict of data on a bus in the information processing apparatus 10 occurs between the host CPU 13b and the other devices such as a sensor and a camera etc., the communication time between the host CPU 13b and the touch controller 12 for the transmission of the coordinate data from the touch controller 12 to the host CPU 13b varies from process to process. Due to the variations as described above, the processing time of the host CPU 13b may vary. In the example illustrated in FIG. 3, the processing time for the coordinate acquisition notification process N1 is longer than the processing time for the coordinate acquisition notification processes N2 and N3.

In the coordinate acquisition notification processes N1 to N3 in the comparative example, the host CPU 13b corrects the coordinates included in the coordinate data received from the touch controller 12 based on the time when the host CPU 13b receives the data. In addition, when the host CPU 13b completes the coordinate acquisition notification processes, the host CPU 13b transmits data including the received coordinate data and the reception time to the application framework. The application framework corrects the coordinate based on the received coordinate data and the reception time. In addition, the application framework notifies the application for performing drawing processes of the display 14 the coordinate corrected according to the display timing, that is, the drawing update interval, of the display 14.

In the example in FIG. 3, the application framework uses a set of the coordinate data and the reception time received from the host CPU 13b to correct the corresponding coordinate in each drawing update interval. In the drawing update interval between U1 and U2 in FIG. 3, the coordinate data sent to the application framework at the timing A and the time when the application framework receives the coordinate data at the timing A, that is, the coordinate data and the reception time acquired in the coordinate acquisition notification process N1 are used to correct the coordinate. In addition, in the drawing update interval between U2 and U3, the coordinate data sent to the application framework at the timings B and C and the time when the time when the application framework receives the coordinate data at the timings B and C, that is, the coordinate data and the reception time acquired in the coordinate acquisition notification processes N2 and N3 are used to correct the coordinates.

As described above, although the touch panel sensor 11 performs the scanning at fixed intervals in the comparative example, the operation time of the coordinate transformation processes C1 to C3 and the coordinate acquisition notification processes N1 to N3 varies. Therefore, the timings A1 to A3 for transmitting data to the application framework do not occur in fixed intervals.

Figure 4:
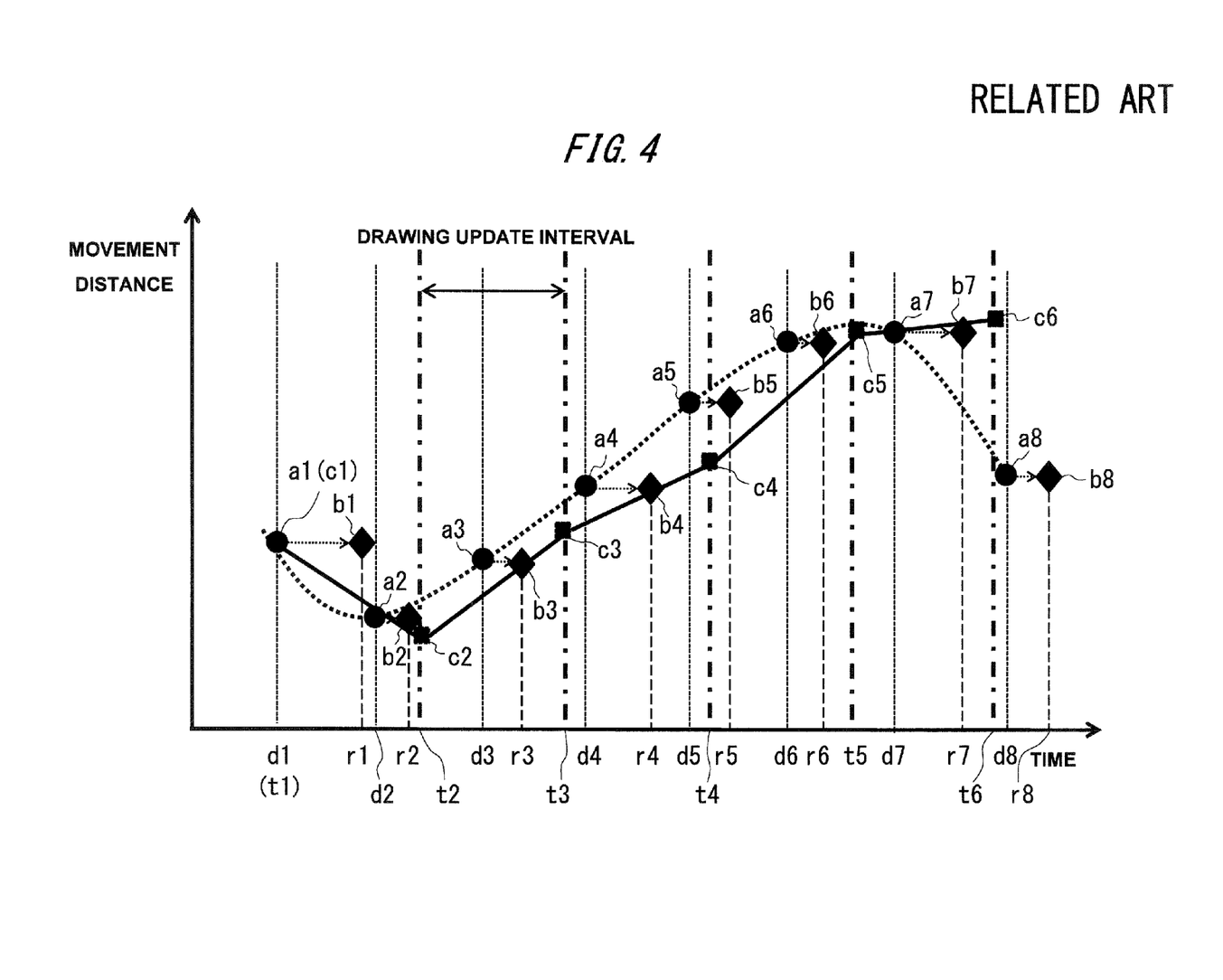
FIG. 4 is a graph illustrating display processes related to coordinates of touch positions in the information processing apparatus according to the comparative example.

FIG. 4 is a diagram illustrating an example of the relation between an actual touch position and a corrected coordinate in the comparative example. In the example as illustrated in FIG. 4, the touch controller 12 performs touch detections of the touch panel sensor 11 at the timings d1 to d8. In FIG. 4, the timings at which the host CPU 13b receives coordinate data from the touch controller 12 are indicated by r1 to r8. The display 14 performs drawing update processes at the timings t1 to t6. In addition, the coordinates of the touch position detected at the timings d1 to d8 are indicated by a1 to a8. Further, the coordinates received by the host CPU 13b at the timings r1 to r8 are indicated by b1 to b8. And, the corrected coordinates displayed at the timings t1 to t6 are indicated by c1 to c6.

As illustrated in FIG. 4, the coordinate a1 of the touch position detected at the timing d1 is acquired by the host CPU 13b as the coordinate b1 which is received at the time indicated by the timing r1 in the coordinate acquisition notification process as described above. That is, although the coordinate a1 is actually detected at the time indicated by the timing d1, the host CPU 13b transmits coordinate data of the coordinate a1 to the application framework as data of a coordinate of a touch position at the time indicated by the timing r1. In addition the host CPU 13b transmits data of the reception time of the coordinate a1 along with the coordinate data. Similarly, the coordinate a2 of the touch position detected at the timing d2 is acquired by the host CPU 13b as the coordinate b2 which is received at the time indicated by the timing r2. And the application framework performs coordinate correction processes by using the coordinate c1 corrected by the previous coordinate correction processes performed at the timing t1, a set of the coordinate b1 received from the host CPU 13b during the drawing update interval t1 to t2 and the reception time indicated by the timing r1 and a set of the coordinate b2 and the reception time indicated by the timing r2. The coordinate corrected by the coordinate correction processes is indicated by c2 in FIG. 4. The coordinate c2 is a coordinate used by the drawing update processes at the timing t2.

And then, the coordinate a3 of the touch position detected at the timing d3 is acquired as a coordinate b3 received by the host CPU 13b at the time indicated by the timing r3. And the application framework performs coordinate correction processes by using the coordinate c2 corrected by the previous coordinate correction processes performed at the timing t2 and a set of the coordinate b3 received from the host CPU 13b during the drawing update interval t2 to t3 and the reception time indicated by the timing r3. The coordinate corrected by the coordinate correction processes is indicated by c3 in FIG. 4. Similarly, the application framework repeatedly performs coordinate correction processes by using a coordinate corrected by the previous coordinate correction processes and a set of a coordinate received from the host CPU 13b at a drawing update interval and the reception time to calculate the coordinates c3 to c6.

FIG. 4 also illustrates the locus of the actual movement of user's finger etc. on the touch panel sensor 11 with the broken line which connects from a1 through a8. In addition, the solid line which connects from c1 through c6 indicates the variation of the coordinates corrected by the host 13 and displayed on the display 14. As illustrated in FIG. 4, the movement of the touch positions of user's finger etc. as indicated by coordinates a2 to a6 is almost linear, whereas the linearity of the movement of the corrected coordinates c2 to c5 decreases so that the deviation from the actual touch positions occurs.

Embodiments

An information processing apparatus 100 according to one embodiment is described below with reference to the drawings. It is noted that the same signs are applied to the counterparts of the elements in the comparative example and the detailed descriptions for the elements are omitted in the following descriptions. The information processing apparatus 100 includes smartphones, tablet terminals and desktop personal computers with capacitance touch panels onboard. However, the information processing apparatus 100 is not limited thereto.

Figure 5:
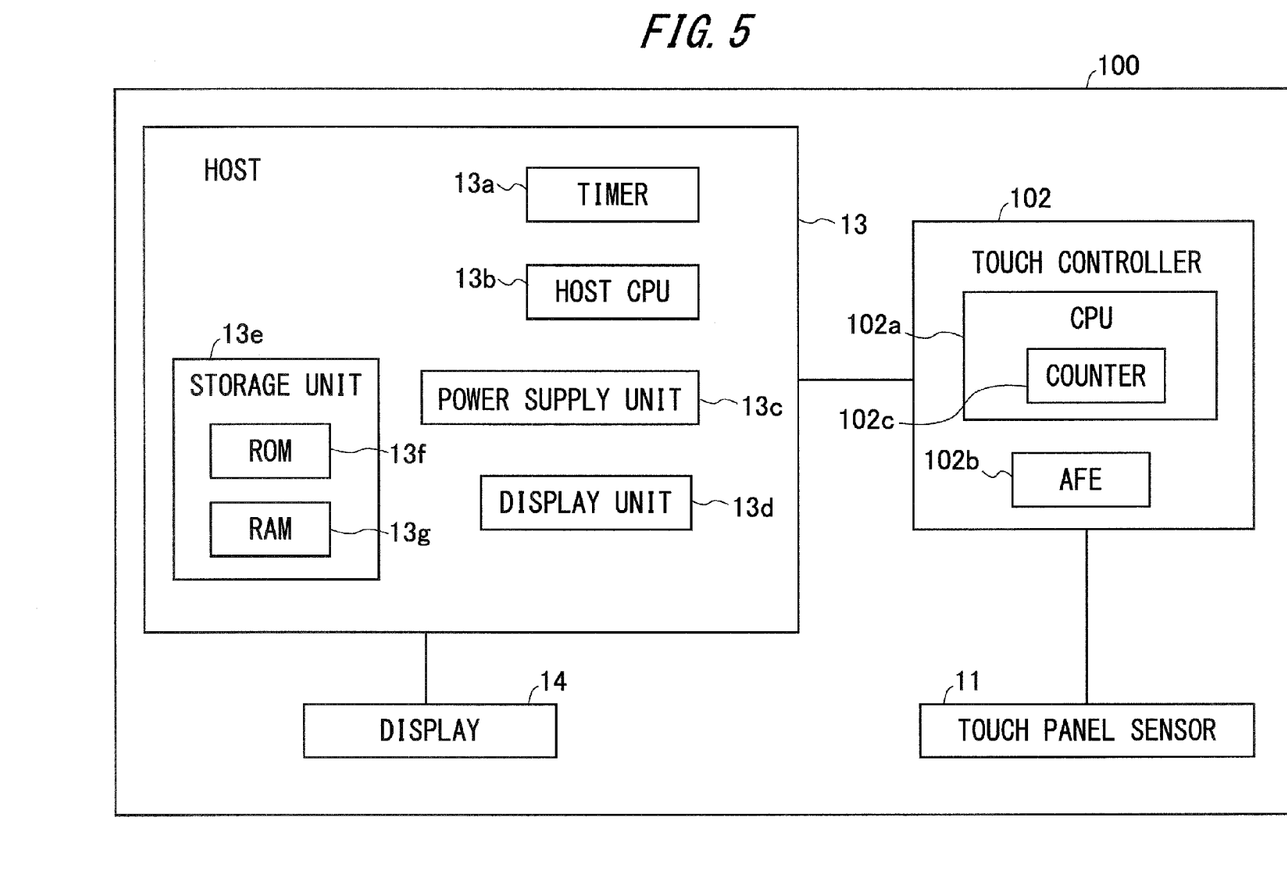
FIG. 5 is a diagram schematically illustrating a hardware configuration of an information processing apparatus according to an embodiment.

FIG. 5 is a diagram schematically illustrating a configuration of the information processing apparatus 100 according to the embodiment. The information processing apparatus 100 includes a touch panel sensor 11, a touch controller 102, a host 13 and a display 14. In addition, the touch controller 102 includes a CPU 102a and an AFE 102b. The CPU 102a includes a counter 102c. Further, the host 13 includes a timer 13a, a host CPU 13b, a power supply unit 13c, a display unit 13d and a storage unit 13e. The storage unit 13e includes a ROM 13f and a RAM 13g.

The host CPU 13b uses the timer 13a to perform timing. The touch controller 102 also uses the counter 102 to perform timing. In the present embodiment, the counter 102c is counted up at a predetermined timing related to the operation clock of the CPU 102a and the like. The counter 102c is reset each time the CPU 102a receives a timing synchronization signal notification from the host CPU 13b. In the present embodiment, the timer 13a of the host 13 includes a real-time clock function for performing timing of the current time even when the information processing apparatus 10 is powered off. On the other hand, the counter 102c of the CPU 102a in the touch controller 102 can be a simplified counter including a timing function using clock signals obtained by frequency dividing of the operation clock of the CPU 102a in consideration of suppressing the power consumption of the touch controller 102. Therefore, the counter 102c can be a counter with lower resolution and lower timing accuracy comparing to the timer 13a.

When the host CPU 13b transmits a time synchronization signal to the touch controller 102, unused pins of the host 13 and the touch controller 102 can be used to ensure the transmission route for transmitting signal a pattern for the time synchronization. Further, the above time synchronization signal notification can be achieved by transmitting a predefined synchronization signal pattern to an existing INT terminal (interruption terminal), an XRES terminal (reset terminal) and the like of the host 13 and the touch controller 102. Alternatively, a data bus such as I2C/SPI between the host 13 and the touch controller 102 can be used to transmit the time synchronization signals.

Figure 6:
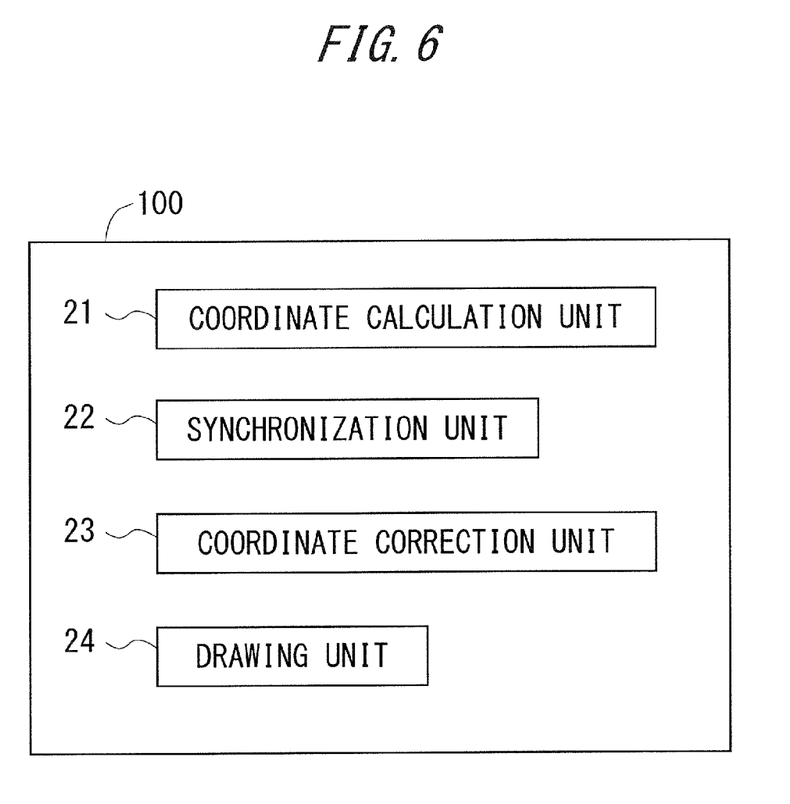
FIG. 6 is a functional block diagram illustrating functional units of the information processing apparatus according to the embodiment.

As illustrated in FIG. 6, the information processing apparatus 100 according to the embodiment functions as an information processing apparatus including a coordinate calculation unit 21, a synchronization unit 22, a coordinate correction unit 23 and a drawing unit 24 when the host CPU 13b deploys programs stored in the ROM 13f onto the RAM 13g and then executes the programs or when the host CPU 13b deploys programs stored in a ROM (not illustrated) onto a RAM (not illustrated) in the touch controller 102 and then executes the programs. For example, the host CPU 13b executes programs for the host CPU 13b as the synchronization unit 22, the coordinate correction unit 23 and the drawing unit 24. In addition, the CPU 102a executes for example programs for the CPU 102a as the coordinate calculation unit 21.

The coordinate calculation unit 21 performs coordinate transformations of the touch positions detected by the touch panel sensor 11. And the counter 102 counts the counter values when the touch panel sensor 11 detects the touch positions. It is noted that the counter 102 can be configured to count the counter values when the coordinate calculation unit 21 performs coordinate transformations of the touch positions. On the other hand, the timer 13a keeps time which is provided for the coordinate correction unit 23. The synchronization unit 22 synchronizes the counting processes of the counter values performed by the counter 102 with the timing process performed by the timer 13a. The coordinate correction unit 23 uses the counter values counted by the counter 102 and the time kept by the timer 13a to correct the coordinates calculated by the coordinate calculation unit 21. The drawing unit 24 uses the coordinates corrected by the coordinate correction unit 23 to perform a variety of drawing processes.

It is noted that the above processes are not necessarily allocated to the CPU 102a and the host CPU 13b as described above. In addition, at least subset of the processes performed by one or more of the coordinate calculation unit 21, the synchronization unit 22, the coordinate correction unit 23 and the drawing unit 24 can be performed by a hardware circuit instead.

Figure 7:
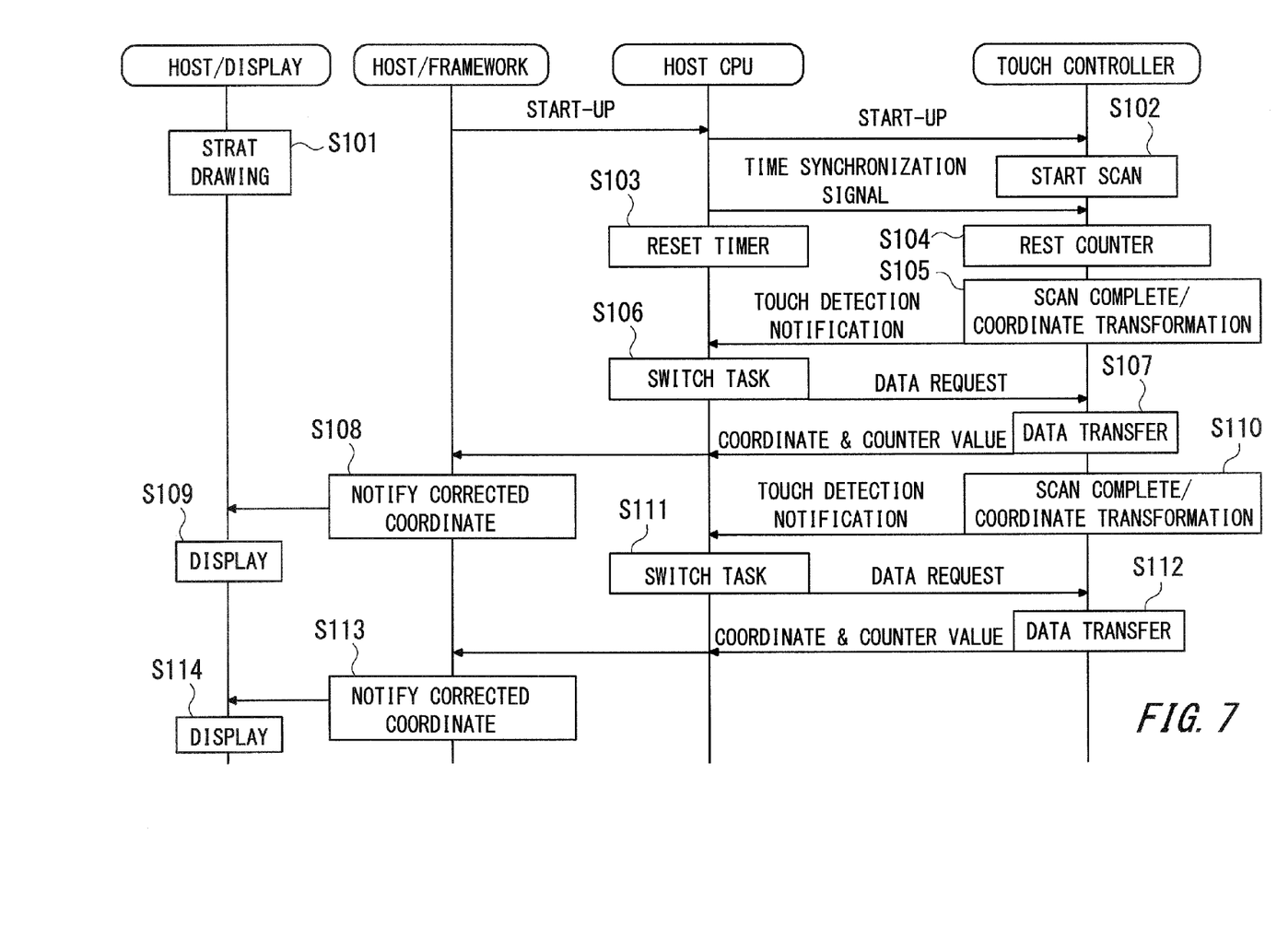
FIG. 7 is a sequence diagram illustrating processes performed by the information processing apparatus according to the embodiment.

FIG. 7 is a sequence diagram of display control processes performed by the information processing apparatus 100 according to the present embodiment. In the following descriptions, each step is abbreviated by S. In the present embodiment, when the information processing apparatus 100 is powered on, the sequence as illustrated in FIG. 6 is executed. First, the display unit 13d of the host 13 initiates the drawing processes of the display 14 (S101). In addition, the application framework for the application executed by the host CPU 13b of the host 13 instructs the host CPU 13b to start up the OS (Operating System) and drivers. After the host CPU 13b starts up the OS and the drivers, the host CPU 13b transmits a signal to instruct the touch controller 102 to start up.

When the touch controller 102 receives the signal of the start-up instruction from the host CPU 13b, the touch controller 102 initiates the scanning of the touch panel sensor 11 (S102). Since the scanning of the touch panel sensor 11 is a conventional technique, the detailed description of the scanning is omitted here. Next, the host CPU 13b transmits a time synchronization signal to the touch controller 102 to synchronize the time of the host CPU 13b with the time of the CPU 102a of the touch controller 102. And the host CPU 13b resets the timer 13a and restarts the timing processes of the timer 13a (S103). Further, when the touch controller 102 receives the time synchronization signal from the host CPU 13b, the CPU 102a resets the counter 102c and restarts the counting of the counter 102c (S104).

Therefore, since the time synchronization signal transmitted from the host CPU 13b is used as a trigger to reset the timer 13a for performing the timing of the host 13 and the counter 102c for performing the timing of the touch controller 102, the timing processes performed by the timer 13a and the counter 102c can be substantively synchronized. It is noted that the time synchronization signal can be transmitted at an arbitrary timing as long as the timer 13a and the counter 102c can be synchronized by the time the scanning is completed in S105 after the scanning is started in S102.

Next, the CPU 102a of the touch controller 102 performs the coordinate transformation of the touch position detected by the scanning of the touch panel sensor 11 (S105). And then, the CPU 102a sends to the CPU 13b a signal notifying that a touch operation of a user's finger etc. is detected by the scanning of the touch panel sensor 11. In addition, the CPU 102 holds the counter value of the counter 102c at the time when the touch operation is detected. When the host CPU 13b receives the signal notifying that the touch operation is detected, the host CPU 13b processes the notification as an interrupt notification and switches from the currently executing task to the task for performing processes as described below (S106).

After the host CPU 13b switches the tasks as described above, the host CPU 13b requests the touch controller 102 to transmit the coordinate data and the counter value to the host CPU 13b. When the touch controller 102 receives the data request from the host CPU 13b, the CPU 102a transmits the coordinate data and the counter value obtained in S105 to the host CPU 13b (S107). When the host CPU 13b receives the coordinate data and the counter value from the CPU 102a, the host CPU 13b transmits the received coordinate data and the received counter value to the application frame work.

In the application framework, the application included in the application framework performs coordinate correction processes to the coordinate data and the counter value received from the host CPU 13. The application included in the application framework performs coordinate correction processes according to the timings of the drawing update of the display 14 performed by the display unit 13d (S108). Since the coordinate correction processes are performed by using conventional correction coefficients and correction functions, the detailed descriptions of the coordinate correction processes are omitted here. The corrected coordinates are transmitted from the application framework to the display unit 13d. And the display unit 13d uses the coordinates received from the application framework to perform the drawing processes of the display 14 (S109).

As described above, the touch controller 102 performs the scanning processes of the touch panel sensor 11 at a fixed timing. Thus, in FIG. 6, the touch controller 102 transmits the coordinate data and the counter value to the host CPU 13b in S107 and then performs in S110 scanning processes and coordinate transformation processes similar to S105. It is noted that since the processes performed in S110 to S114 are similar to the processes performed in S105 to S109, the descriptions of the processes in S110 to S114 are omitted here.

As described above, the time when the touch positions are detected by the touch panel sensor 11 is determined based not on the time acquired from the timer 13a of the host 13 but on the counter values indicated by the counter 102c of the CPU 102a of the touch controller 102 in the present embodiment. In addition, since the coordinate correction processes are performed by using the determined detection time and the coordinates of the touch positions, the coordinates can be advantageously corrected without influences from the variations of the processing time of the coordinate transformations performed by the touch controller 102 and the variations of the processing time of the acquisitions and the notifications of the coordinate data and the counter values performed by the host CPU 13b.

Figure 8:
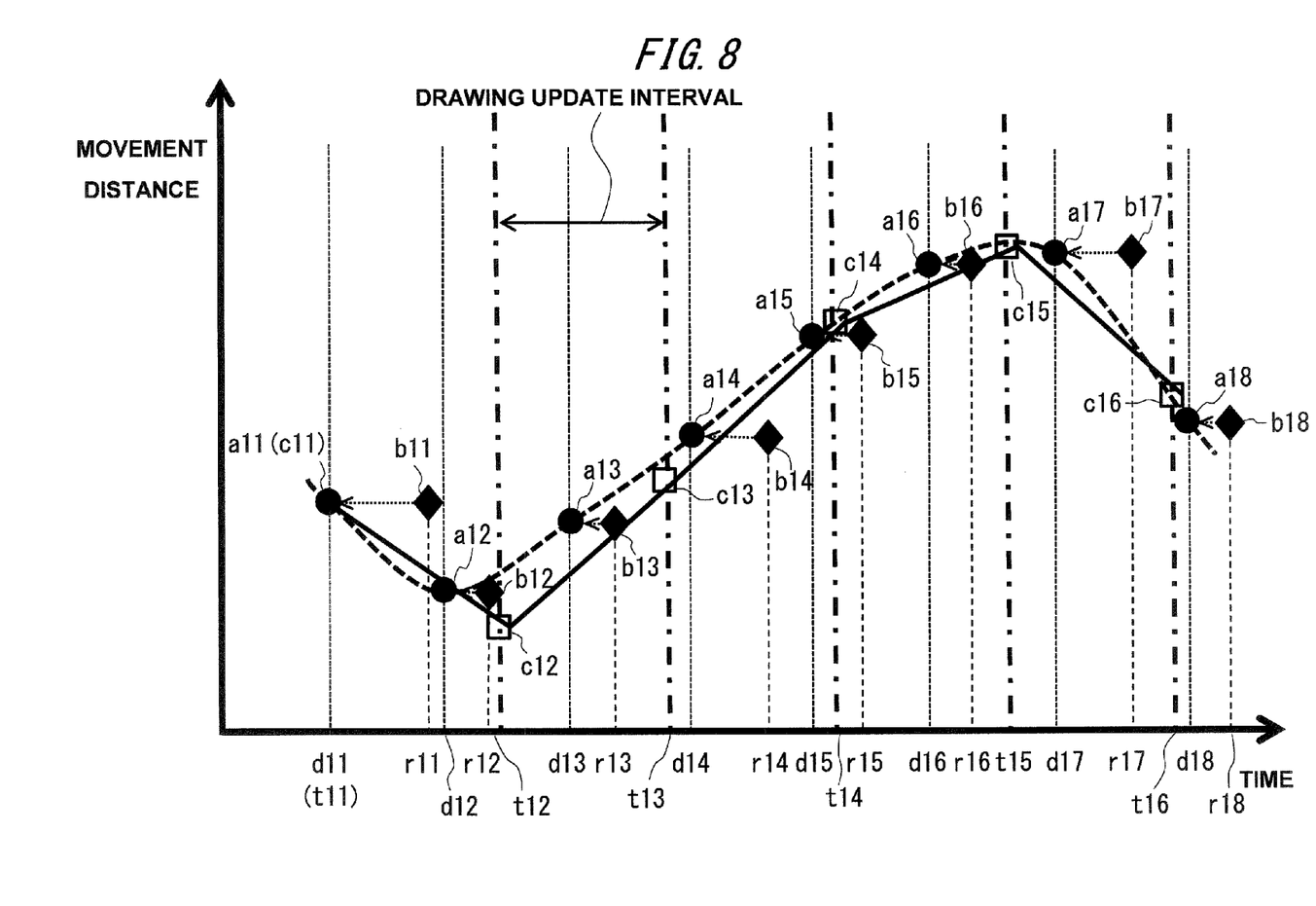
FIG. 8 is a graph illustrating display processes related to coordinates of touch positions in the information processing apparatus according to the embodiment.

FIG. 8 exemplifies the relations among the actual touch positions of the touch panel sensor 11, the coordinates detected by the touch controller 12 and the coordinates corrected by the host 13. In the example as illustrated in FIG. 8, the touch detections of the touch panel sensor 11 are performed at the timings d11 to d18 by the touch controller 102. In FIG. 8, the timings when the host CPU 13b receives coordinates data from the touch controller 102 are indicated by r11 to r18. The drawing update processes of the display 14 are performed at the timings t11 to t16. In addition, the coordinates of the touch positions detected at the timings d11 to d18 are indicated by a11 to a18. The coordinates which the host CPU 13b receives at the timings r11 to r18 are indicated by b11 to b18. The corrected coordinates displayed at the timings t11 to t116 are indicated by c11 to c16.

As illustrated in FIG. 8, the coordinate a11 of the touch position detected at the timing d11 is acquired by the host CPU 13b as the coordinate b11 received at the time indicated by the timing r11. Similarly, the coordinate a12 of the touch position detected at the timing d12 is acquired by the host CPU 13b as the coordinate b12 received at the time indicated by the timing r12.

In the present embodiment, the counting processes of the counter 102c and the timing processes of the timer 13a are synchronized. Thus, when a counter value of the counter 102c is determined, the time of the timer 13a at the time when the counter 102c indicates the counter value can also be determined. Therefore, the host CPU 13b uses the time of the timer 13a corresponding to the counter value of the counter 102c of the CPU 102a of the touch controller 102 to correct the coordinate included in the coordinate data received from the touch controller 102. In the comparative example as described above, the host CPU 13b uses the time indicated by the timer 13a when the host CPU 13b receives the coordinate data from the touch controller 102. However, in the present embodiment, the host CPU 13b can use the coordinate b11 of the touch position received at the timing r11 not as the coordinate at the time indicated by the timer 13a at the timing r11 but as the coordinate at the time indicated by the timer 13a at the timing d11 to perform the coordinate correction processes.

It is noted in the present embodiment that the processing time related to the coordinate correction processes of the touch controller 102 and the processing time related to the coordinate acquisition processes of the host CPU 13b vary in time as indicated by the timings r11 to r18. Therefore, the host CPU 13b cannot receive the coordinates b11 to b18 at a fixed timing from the touch controller 102. However, the host CPU 13b can use the counter values of the counter 102c of the CPU 102 to determine the time of the timer 13a, which is synchronized with the counter 102c, corresponding to the counter values to recognize the coordinates b11 to b18 as the coordinates a11 to a18. As a result, the application framework of the host 13 can preferably correct the coordinates based on the timing of the touch detection by the touch panel sensor 11 regardless of the variations of the processing time as described above.

FIG. 8 illustrates the coordinate c12 corrected by the coordinate correction processes using the coordinates b11 and b12. The coordinate c12 is a coordinate used in the drawing update processes at the timing t12. In addition, the coordinate a13 of the touch position detected at the timing d13 is acquired by the host CPU 13b as the coordinate b13 received at the time indicated by the timing d13. And the host CPU 13b uses the time of the timer 13a to determine the time corresponding to the counter value indicated by the counter 102c. Further, the host CPU 13b sends the coordinate b13 and the determined time to the application framework. The application framework performs the coordinate correction processes by using the coordinate c12 corrected by the previous coordinate correction processes performed at the timing t12 and a set of the coordinate c12 received from the host CPU 13b during the drawing update interval between t12 and t13 and the time determined by the host CPU 13b. FIG. 8 illustrates the resultant coordinate as the coordinate c13. Similarly, the application framework performs the coordinate correction processes to calculate the coordinate c13 to c16 by using the coordinates corrected by the previous coordinate correction processes and sets of coordinates received from the host CPU 13b at the drawing update intervals and the determined time.

Similar to FIG. 4, the broken line connecting from a11 to a18 illustrates the actual movement locus of user's finger etc. on the touch panel sensor 11. In addition, the solid line connecting from c11 to c16 illustrates the variation of the coordinates displayed on the display after the host corrects the coordinates. As illustrated in FIG. 8, the movement of the touch positions by user's finger etc. as indicated by the coordinates a12 to a16 is almost linear. The movement corresponds to the movement of the touch positions by user's finger etc. indicated by the coordinates a2 to a6 in FIG. 4. As illustrated in FIG. 8, the coordinates c12 to c15 corrected by the coordinate correction processes in the present embodiment are closer to the movement locus of user's finger etc. than the coordinates c2 to c5 to the movement locus in FIG. 4. That is, the movement indicated by the corrected coordinates c12 to c15 can improve so-called linearity comparing to the comparative example. Since the coordinates corrected preferably as described above can be used in the present embodiment, the drawing processes can be achieved with properly reflecting the touch positions on the display 14 and thus the ability of following user's touch operations and the user operability can be improved.

Therefore, even when the delay related to the processes performed by the information processing apparatus 100 as described above varies in time, stable user operability can be achieved with suppressing the influence from the variations of the delay and regardless of the changes in the environmental conditions for user's touch operations. It is noted here that the delay may occur in the processes as described above in relation to the noise protection for an AC adapter (not illustrated) of the touch panel sensor 11, the increase of the touch area of the touch panel sensor 11, the adjustment of various parameters periodically performed by the CPU 102a and the host CPU 13b in response to the variation in environmental temperature of the information processing apparatus 100 and the delay related to the interrupt processing performed by the host CPU 13b as described above.

Additionally, the host of the information processing apparatus in a conventional technique estimates coordinates of touch positions in the future and uses the estimated coordinates to perform the drawing processes of the display in order to improve the ability of following user's touch operations. However, as described in the comparative example, the CPU of the host performs coordinate correction processes based on the time which is subject to the influences from a variety of delays as described above. Therefore, when, for example, a user quickly moves a finger on the touch panel sensor so that the touch positions change substantially, the coordinates of the touch positions may be corrected as coordinates which are located at positions away from the actual touch positions of the user's finger. In such a case, the user operability of the touch panel sensor can deteriorate. On the other hand, the CPU of the host in the present embodiment can preferably determine the time when the actual touch positions are detected regardless of the occurrence of the delay and the length of the delay, and then can perform coordinate correction processes based on the determined time. Thus, the host CPU in the present embodiment can determine the coordinates of the touch positions in the future more accurately than in the comparative example.

Although specific embodiments are described above, the configurations and the processes of the information processing apparatus as described and illustrated in the above embodiment can be arbitrarily modified and/or combined. For example, although the host CPU 13*b* transmits a time synchronization signal to the touch controller 102 after the touch controller 102 starts up, the timing at which the host CPU 13*b* transmits a time synchronization signal to the touch controller 102 and the number of times of transmitting the time synchronization signals can be set arbitrarily. In addition, although the touch panel sensor detects the touch positions of the user's touch operations in the above embodiment, touch input pointing devices such as touch pads can be used instead of the touch panel sensor 11.

Further, in the example as illustrated in FIG. 7, the transmission of coordinate data and a counter value from the touch controller 102 is performed once in S107 during the drawing update interval corresponding to the period from the display processes in S101 to the display processes in S109. However, when the display processes do not occur in S109, that is, the drawing update interval is the period from S101 to S114 in the case in FIG. 7, the transmission of coordinate data and a counter value from the touch controller 102 occurs twice, namely, in S107 and S112. In this case, the application framework combines each set of coordinate data and a counter value transmitted in S107 and S112 to calculate a corrected coordinate as described above, and then notifies the display unit 13*d* of the corrected coordinate. The timings at which the host 13 and the touch controller 102 perform the coordinate correction processes and the notification processes can be changed arbitrarily according to the timing of scanning of the touch panel sensor 11 and the timing of drawing of the display 14.

<<Computer Readable Recording Medium>>

It is possible to record a program which causes a computer to implement any of the functions described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

The technique disclosed according to the embodiment can provide an information processing apparatus to correct drawing positions with preferably reflecting user's touch input operations and achieve smooth user operability.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a touch input sensor configured to detect a touch position;
a touch controller configured to receive the touch position from the touch input sensor and further configured to calculate a coordinate of the touch position detected by the touch input sensor for inputting information of a position on a display;
a counter disposed within the touch controller configured to count a counter value representing a time when the touch position is detected, the counter value being counted at a predetermined timing corresponding to a clock of the touch controller, and the counter value being stored by the touch controller;
a host, separate from the touch controller; and
a processor within the host configured to
synchronize the counter with a timer disposed within the host before the touch controller calculates the coordinate, the timer including a real-time clock in the host performing timing of a current time, and the synchronizing of the counter including resetting the counter in the touch controller based upon receiving a time synchronization signal in the touch controller from the host,
receive the calculated coordinate of the touch position from the touch controller, after the counter has been synchronized with the timer, along with the count value associated with the touch position,
acquire time information from the timer to correct the calculated coordinate of the touch position using the time information and the counter value of the counter synchronized with the timer, and
perform a drawing process of the display using the corrected coordinate.

2. A display control method, comprising:
receiving, by a touch controller, a touch position from a touch input sensor and further calculating, by the touch controller, a coordinate of the touch position on a display using the touch controller when the touch input sensor for inputting information of a position on the display detects the touch position;
counting, by a counter disposed within the touch controller, a counter value representing a time when the touch position is detected, the counter value being counted at a predetermined timing corresponding to a clock of the touch controller, and the counter value being stored by the touch controller;

synchronizing, by a processor within a host, separate from the touch controller, the counter with a timer disposed within the host before the coordinate is calculated, the timer including a real-time clock in the host performing timing of a current time, and the synchronizing of the counter including resetting the counter in the touch controller based upon receiving a time synchronization signal in the touch controller from the host;

receiving, by the processor, the calculated coordinate of the touch position from the touch controller, after the counter has been synchronized with the timer, along with the count value associated with the touch position;

acquiring, by the processor, time information from the timer to correct the calculated coordinate of the touch position using the time information and the counter value of the counter synchronized with the timer; and performing, by the processor, a drawing process of the display using the corrected coordinate.

3. A non-transitory computer-readable recording medium storing a program that causes a computer to execute a process comprising:

receiving a touch position from a touch input sensor and further calculating a coordinate of the touch position on a display using a touch controller when the touch input sensor for inputting information of a position on the display detects the touch position;

counting a counter value of a counter disposed within the touch controller representing a time when the touch position is detected, the counter value being counted at a predetermined timing corresponding to a clock of the touch controller, and the counter value being stored by the touch controller;

synchronizing the counter with a timer disposed within a host, separate from the touch controller, before the coordinate is calculated, the timer including a real-time clock in the host performing timing of a current time, and the synchronizing of the counter including resetting the counter in the touch controller based upon receiving a time synchronization signal in the touch controller from the host;

receiving the calculated coordinate of the touch position from the touch controller, after the counter has been synchronized with the timer, along with the count value associated with the touch position;

acquiring time information from the timer to correct the calculated coordinate of the touch position using the time information and the counter value of the counter synchronized with the timer; and performing a drawing process of the display using the corrected coordinate.

* * * * *